United States Patent [19]

Blaisdell et al.

[11] Patent Number: 4,500,948
[45] Date of Patent: Feb. 19, 1985

[54] ONE-PIECE FRAME FOR AN ELECTRIC LAMP

[75] Inventors: Ronald G. Blaisdell, Saugus; Peter R. Gagnon, Georgetown, both of Mass.

[73] Assignee: GTE Products Corporation, Stamford, Conn.

[21] Appl. No.: 539,852

[22] Filed: Oct. 7, 1983

[51] Int. Cl.³ .............................................. F21V 21/00
[52] U.S. Cl. .................................... 362/382; 362/396; 362/226; 339/46
[58] Field of Search ....................... 362/382, 396, 226; 339/46

[56] References Cited
U.S. PATENT DOCUMENTS

| 164,599 | 6/1875 | Schroeder | 362/396 X |
| 420,607 | 2/1890 | Reinhardt | 362/396 X |

Primary Examiner—Stephen J. Lechert, Jr.
Attorney, Agent, or Firm—Joseph S. Romanow

[57] ABSTRACT

This invention provides a one-piece frame for electric lamps. The frame has a one-piece body formed by bending operations on a pre-cut or pre-stamped blank sheet of stiff electrically conductive material. In an alternate embodiment of the invention, the frame has a one-piece body formed by bending operations on a single strand of stiff electrically conductive wire. Lamps employing the invention will be easier and cheaper to construct, and they will be of comparable or improved quality compared with their counterparts under the prior art.

4 Claims, 4 Drawing Figures

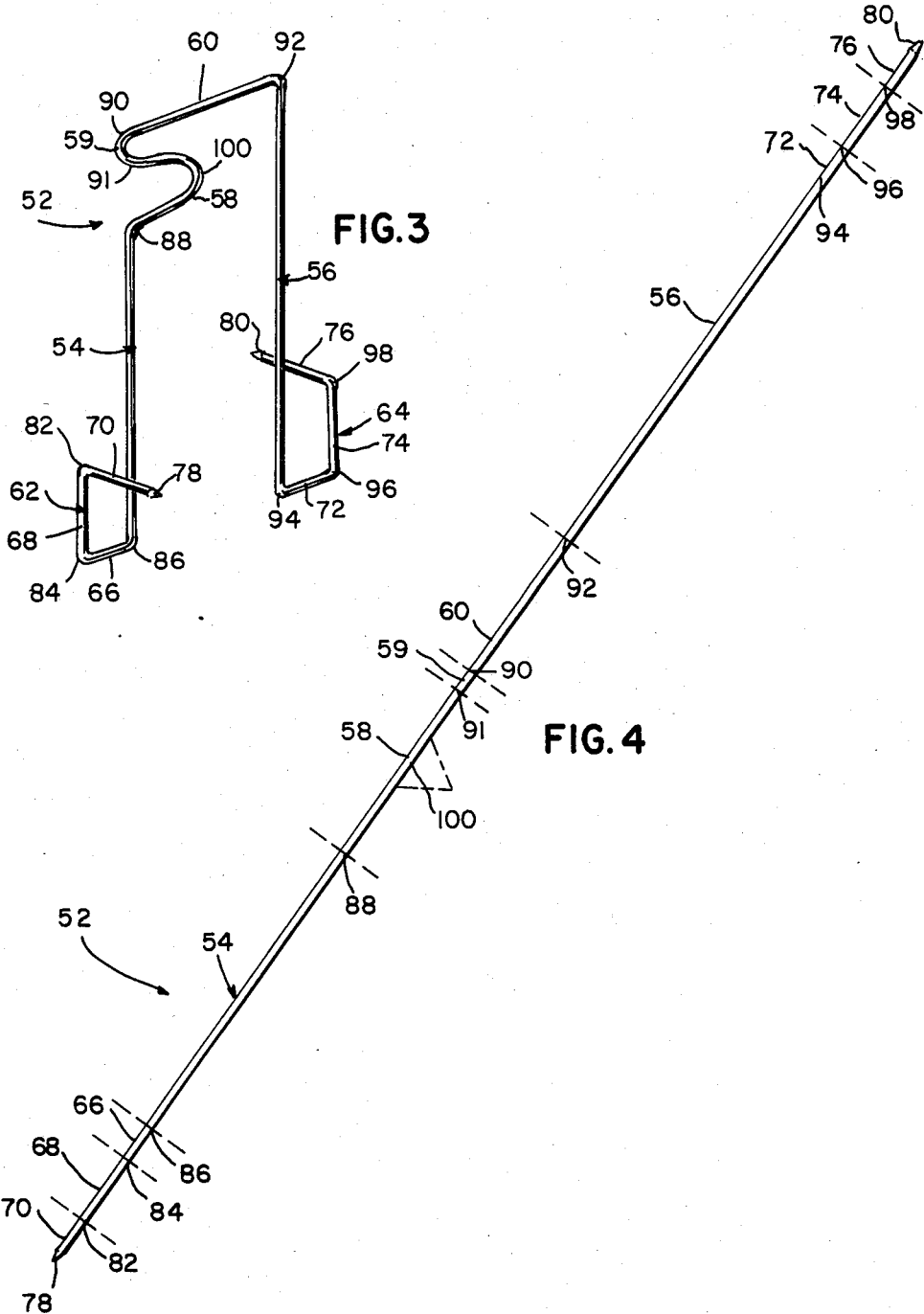

ONE-PIECE FRAME FOR AN ELECTRIC LAMP

TECHNICAL FIELD

This invention relates to electric lamps and more particularly to one-piece frames for electric lamps.

BACKGROUND ART

Under the existing art, a frame assembly for an electric lamp is constructed by fastening together with suitable means, such as by welding, two or more component parts in order to form the completed frame assembly. The necessity of fastening the component parts together makes the construction of a frame assembly a relatively complicated and expensive step in the manufacture of lamps employing such frame assemblies. Moreover, the presence of a welded joint or other type of fastening joint in the frame assembly creates an additional source of possible structural and electrical defects in the lamp-manufacturing process.

In copending United States patent application, Ser. No. 469,841, filed Feb. 25, 1983, by Blaisdell et al, assigned to GTE Products Corporation, a frame assembly for mounting a light-source capsule within an outer envelope of an electric lamp is disclosed. A frame assembly illustrated in this copending application is constructed by welding together the component parts.

It would be an advancement of the art if a frame assembly for electric lamps could be provided where the frame assembly is constructed without fastening together component parts thereof.

DISCLOSURE OF THE INVENTION

It is, therefore, an object of this invention to obviate the deficiencies in the prior art.

It is another object of this invention to provide a one-piece frame for an electric lamp which can be constructed without the necessity of fastening together component parts thereof.

It is a further object of this invention to provide a one-piece frame for an electric lamp which will enable the manufacture of such lamps to be simpler and more economical.

It is still another object of this invention to provide a one-piece frame for an electric lamp which will improve the structural and electrical integrity of such lamps.

These objects are accomplished, in one aspect of the invention, by the provision of a one-piece frame for an electric lamp comprising a one-piece body formed by bending a single sheet of stiff electrically conductive material or bending a single strand of stiff electrically conductive wire.

Lamps having one-piece frames as herein described are easier andd more economical to construct and have comparable or improved quality compared with their counterparts constructed under the prior art.

BRIEF DESCRIPTION OF THE DRAWINGS

FIG. 3 is a pictorial view of an alternate embodiment of the invention; and

FIG. 4 is a plan view of a pre-cut strand from which the embodiment of the invention shown in FIG. 3 may be formed by bending operations.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

The embodiments of the invention described herein have the same functional characteristics as disclosed in the above referenced copending application, with Ser. No. 469,841. The entire contents of this copending application are incorporated herein by reference.

Figure 1:
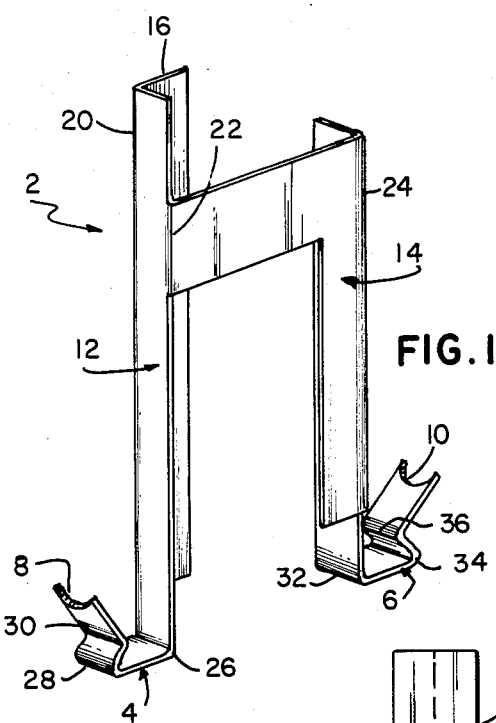
FIG. 1 is a pictorial view of one embodiment of the invention.

FIG. 1 illustrates frame 2, being the "clamp-on" type. Frame 2 has clamps 4 and 6 as means for mounting frame 2 on the outer envelope of the lamp. Leg 12 may be longer than leg 14, as shown in the drawing, in which case extension 16 provides a convenient mount for one lead-in wire of the light-source capsule.

Figure 2:
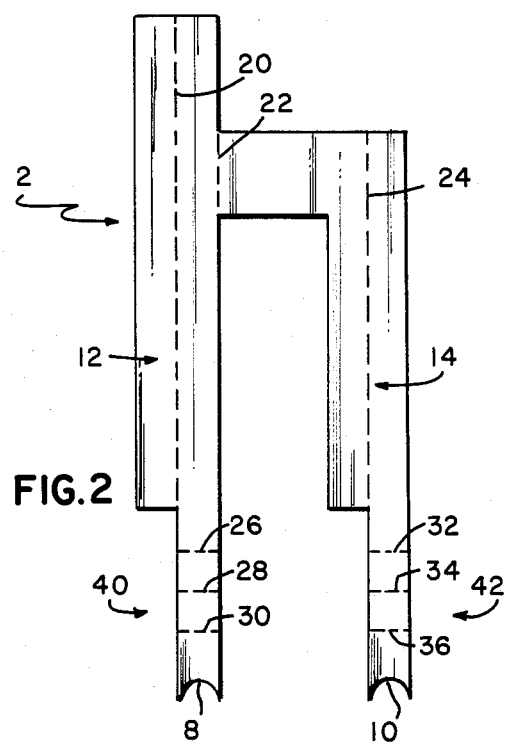
FIG. 2 is a plan view of a pre-cut flat blank from which the embodiment of the invention shown in FIG. 1 can be formed by bending operations.

FIG. 2 shows a pre-cut flat blank from which frame 2 can be formed by bending operations only. The dashed lines in FIG. 2 show where the bends in the blank should be made. Bends 20, 22 and 24, each made through a right angle, approximately, will form the portion of the frame positioned within the outer envelope. Bends 26, 28 and 30 form the mounting and locking means for leg 12. Likewise, bends 32, 34 and 36 form the mounting and locking means for leg 14.

Bend 26 is made through a right angle, approximately, with tab 40 protruding away from leg 12. Bend 28 is essentially C-shaped with the opening facing leg 12. Bend 30 is essentially another C-shaped bend in the reverse direction, i.e., with the opening facing away from leg 12. As shown in FIG. 1, the composite of bends 28 and 30 forms essentially a reverse S-shaped curve. Since barbed tip 8 has been pre-cut in this embodiment, leg 12 will be completely formed solely by the described bending operations. In similar manner, bends 32, 34 and 36 may be made in tab 42, thereby completing leg 14.

FIG. 3 illustrates frame 52, being the "push-on" type. Frame 52 has legs 54 and 56. Loop 58 may be formed as a part of leg 54 in which case loop 58 provides a convenient mount for one lead-in wire of the light-source capsule. Loop 58 may be employed by itself or in combination with top 60 as a support for one lead-in wire of the light-source capsule.

Feet 62 and 64 provide means for mounting frame 52 to the outer envelope of the lamp. Segments 66, 68 and 70 of foot 62 fit into mating grooves of the outer envelope. The segments are held securely within the mating grooves by the mounted lamp base. Likewise, segments 72, 74 and 76 provide mounting means for foot 64. Barbed tips 78 and 80 provide means for locking the lamp base on the outer envelope.

FIG. 4 shows a pre-cut strand from which frame 52 can be formed by bending operations only. The dashed lines in FIG. 4 show where the bends in the strand should be made. All bends are made in the plan determined by legs 54 and 56 except for bends 82 and 98 which are made such that segments 70 and 76 are approximately perpendicular to such plane. The respective directions of segments 70 and 76 are determined by the mating grooves of the outer envelope.

As shown in FIG. 3, loops 58 is essentially C-shaped with the opening facing the outside of the frame. Bend 100 may comprise a single bend of relatively uniform curvature or it may comprise several bends of varying curvature.

In the embodiment of the invention shown in FIG. 3, segment 59 is virtually nonexistent; bends 90 and 91 may be described as a single bend of approximately 180°. In an alternate embodiment, bends 90 and 91 each may be separately formed through approximately 90° with straight segment 59 between them. As has been mentioned, the purpose of loop 58 is to provide a mount or an additional mount for one lead-in wire of the light-source capsule. In some embodiments of the invention, loop 58 may not be necessary.

Each of the remining bends is made through a right angle, approximately. The respective directions of each bend may be determined by inspection of FIG. 3. As may be observed in the drawing, bend 90 and 92 essentially form top 60 and legs 54 and 56. Bends 86, 84 and 82 form foot 62; and bends 94, 96 and 98 form foot 64.

In both embodiments of the invention shown in FIGS. 1 and 3, the order of the bending operations is not necessarily critical. Although completely pre-cut or pre-stamped blanks are described herein, it may be deirable in alternate embodiments to mix cutting and bending operations.

Materials employed for frames 2 and 52 should have structural rigidity and elasticity so that the frames will securely support the light-source capsule, mount the outer envelope, and lock the lamp base to the outer envelope. The material must be electrically conductive, because frames 2 and 52 are part of the electrical circuit of the lamp.

In laboratory examples, frame 2 was constructed from a blank of 0.020 inch (0.051 centimeter) thick nickel-plated stainles steel sheet; frame 52 was constructed from a strand of 0.050 inch (0.127 centimeter) diameter stainless steel wire.

The elimination of fastening joints provides one-piece frames for electric lamps which are easier and cheaper to manufacture, which have improved structural rigidity and precision, and which have improved electrical integrity. In the case of the evolving art of tungsten-halogen replacements for standard Edison-type lamps, the one-piece frame disclosed herein provides a suitable component for commercially feasible products.

While there have been shown what are at present considered to be preferred embodiments of the invention, it will be apparent to those skilled in the art that various changes and modifications can be made herein without departing from the scope of the invention as defined by the appended claims.

We claim:

1. A one-piece frame for mounting a light-source capsule within the outer envelope of an electric lamp comprising:
   (a) a one-piece body formed by means of bending a single sheet of stiff electrically conductive material, said one-piece body having two legs and a bridge between said legs, each of said legs being formed to provide means for mounting said frame within said outer envelope, said body being sufficiently rigid to provide support for mounting said light-source capsule thereon, said body having sufficient electrical conductivity to act as a part of an electrical circuit through which electrical power is conveyed to said light-source capsule from an external source.

2. A frame as described in claim 1 wherein said body is formed by means of cutting and bending said single sheet of stiff electrically conductive material.

3. A one-piece frame for mounting a light-source capsule within the outer envelope of an electric lamp comprising:
   (a) a one-piece body formed by means of bending a single strand of stiff electrically conductive wire, said one-piece body having two legs and a bridge between said legs, each of said legs being formed to provide means for mounting said frame within said outer envelope, said body being sufficiently rigid to provide support for mounting said light-source capsule thereon, said body having sufficient electrical conductivity to act as a part of an electrical through which electrical power is conveyed to said light-source capsule from an external source.

4. A frame as described in claim 3 wherein said body is formed by means of cutting and bending said single strand of stiff electrically conductive wire.

* * * * *